Dec. 11, 1962  W. T. BISHOP ET AL  3,068,378
AUTOMATIC LIGHTS FOR VEHICLES
Filed Feb. 25, 1960
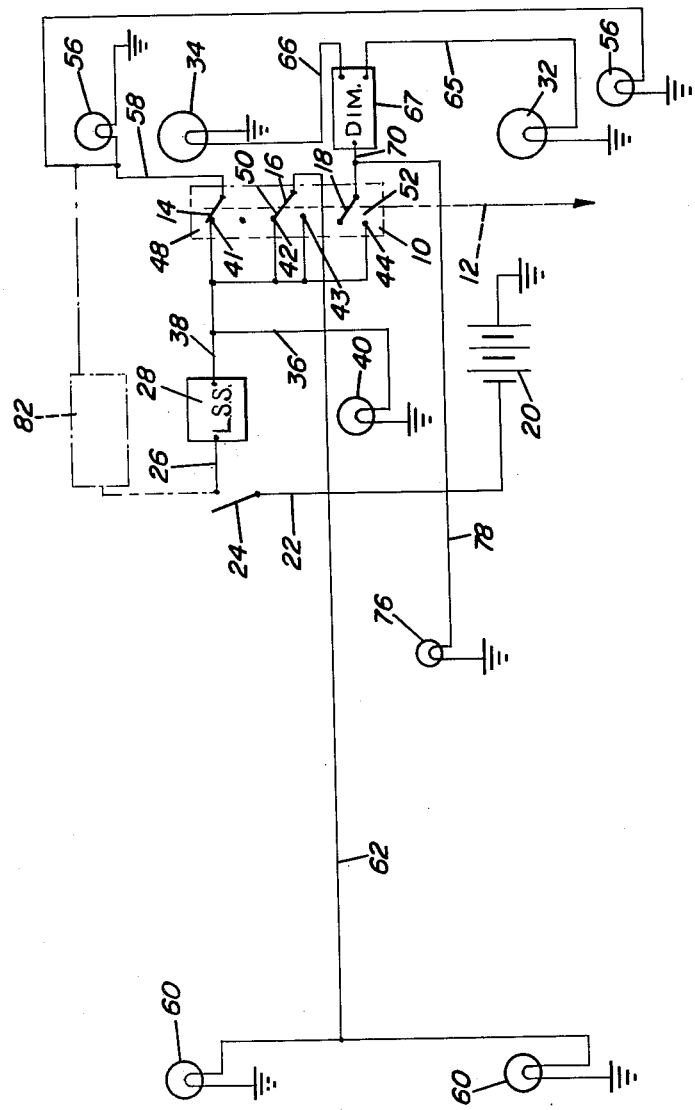
William T. Bishop
Larry J. Blaik
INVENTORS

3,068,378
AUTOMATIC LIGHTS FOR VEHICLES
William T. Bishop, % Mrs. H. C. Bishop, Rte. 1, Barnesville, Ga., and Larry J. Blaik, Box 337, Peru, Ill.
Filed Feb. 25, 1960, Ser. No. 11,072
4 Claims. (Cl. 315—77)

This invention relates to vehicle lighting systems and more particularly to a safety lighting system which requires the lighting of a motor vehicle to be correctly adjusted for the motor vehicle depending on whether the motor vehicle is stopped or in motion.

An object of the invention is to provide a circuit for the control of the lighting system of a motor vehicle, wherein the lights of a motor vehicle are on when the ignition switch is on and it is dark enough to require lights. When the shift lever of a motor vehicle is adjusted to the position at which the motor vehicle will move under its own power, the headlights and instrument panel lights are immediately turned on automatically, thereby preventing the vehicle operator from moving his motor vehicle unless the all-important headlights are on.

A further object of the invention is to provide a lighting system for motor vehicles which is operatively connected with the transmission control of the motor vehicle. It is believed that a large number of motor vehicles today are equipped with automatic transmissions requiring the movement of a shift lever to place the motor vehicle in such condition that there is a driving connection between the engine and the rear wheels of the motor vehicle. Therefore, the shift mechanism, for instance the lever thereof, is selected as the mechanical part with which the circuit is associated for the control of the circuit. A typical example would be in connection with motor vehicles requiring the lever to be moved to the drive, low or reverse position before the motor vehicle drive connection is established between the engine and the rear wheels. In such a situation movement of the lever causes the multiple switch to be actuated thereby closing a circuit containing the headlights of the motor vehicle and incidentally, the tail lights and the instrument panel lights. If there is insufficient light for safe operation of the motor vehicle, these lights are automatically turned on.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The FIGURE is a schematic wiring diagram showing a circuit constructed in accordance with the invention.

In the accompanying drawing there is an illustration of a switch 10 with switch arm 12 adapted to be connected to the shift lever of a motor vehicle, regardless of the manufacturer's make of transmission with which the shift lever is associated. The term "lever" is used in the broad sense in that the switch arm 12 may be directly connected to the lever or some mechanical part operated by the lever. The important thing is that switch 10 shall be actuated in response to movement of the shift lever.

Switch 10 has three movable contacts 14, 16 and 18, and these contacts are movable in unison. The movable contacts 14, 16 and 18 constitute part of switches which will be described in more details subsequently.

A source of electrical potential, diagrammatically illustrated as battery 20 of the motor vehicle, is shown connected by way of conductor 22 to the conventional ignition switch 24 of the motor vehicle. Conductor 26 extends from the motor vehicle switch and is operatively connected with a light sensitive switch 28 which monitors the entire circuit. The light sensitive switch may be in the form of a photocell and amplifier and being conventional, only the function is described. When there is sufficient light, the light sensitive switch remains open. However, as soon as there is insufficient light for a motorist to operate his motor vehicle safely without the aid of headlights 32 and 34, the light sensitive switch 28 automatically closes. Accordingly, switch 28 is in series with the ignition switch 24 and the battery 20.

Tracing the path of potential through the circuit, when ignition switch 24 is closed, and light sensitive switch 28 is open, there is an open circuit. However, if switch 28 is closed, current flows through conductor 36 which is attached to conductor 38, the latter being secured operatively to light sensitive switch 28. Conductor 36 energizes the dashlight or lights 40 of the motor vehicle. Further, conductor 38 is connected to contacts 41, 42, 43 and 44 of switch 10 whereby each of these contacts becomes energized. Contact 41 cooperates with movable contact 14 to form a switch 48, while contacts 42 and 43 cooperate with movable contacts 16 to form a switch 50, and contact 44 cooperates with movable contact 18 to form a switch 52, the three switches 48, 50 and 52 being ganged and constituting the previously mentioned and generally referred to switch 10.

Switch 48 controls the energization of the parking lamps 56 of the motor vehicle by way of conductor 58 extending from the movable contact 14 of switch 48. Switch 50 controls the tail lamps 60 which are connected to movable contact 16 by way of conductor 62. Notice that both fixed contacts 42 and 43 are energized at all times whereby the tail lamps 60 will be energized any time that the ignition switch 24 is closed and a light sensitive switch 28 is also closed. Headlights 32 and 34 are connected by way of conductors 65 and 66 to the conventional dimmer switch 67, and the conventional dimmer switch is connected by conductor 70 to the movable contact 18 of switch 52. An additional light 76 is connected by way of conductor 78 to conductor 70, and the additional light 76 merely diagrammatically represents the presence of any additional lights such as will be required or desired. For instance, running lights on a truck which are over and above those required in a passenger vehicle may be connected in this way.

When switch 10 is in the position shown in the drawing, the transmission shift lever will be in a park or neutral or corresponding position at which the motor vehicle drive connection between the engine and the wheels of the motor vehicle is broken. Consequently, closing ignition switch 24 and having light sensitive switch 28 in the closed position will cause the parking lights to be energized, the tail lights 60 to be energized, and the headlamps to be deenergized. The dash or instrument panel light 40 will be energized since this is ahead of switch 10 in the circuit.

As soon as the shift lever is moved to such position that the motor vehicle is capable of forward movement, and this applies to standard transmission as well as automatice transmissions or overdrive transmissions, switch arm 12 is moved in the direction of the arrow (see the figure) thereby opening switch 14, moving switch 50 but maintaining it in a closed position, and closing switch 52 thereby energizing the head lamps. Consequently, the tail lamps 60 remain lighted; the head lamps become lighted; the parking lamps 56 become extinguished; the accessory light 76 if any exists, are energized; and the instrument panel lamp 40 remains energized.

A number of variations may be made in the invention. For example, a conventional switch 82 may be connected across conductor 58 and the hot side of light sensitive switch 28. Upon operation of the conventional switch 82, the parking lamps may be made to become energized, and the same holds true of back-up lights which may be controlled from switch 82.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A motor vehicle lighting system wherein the motor vehicle has a battery and an ignition switch operatively connected with the battery, said lighting system comprising a light sensitive switch, a conductor extending from the ignition switch to the light sensitive switch thereby connecting the battery, ignition switch and light sensitive switch in series, a conductor extending from said light sensitive switch, head lamps, a main control switch having a movable contact operatively connected with the transmission control mechanism of the motor vehicle, conductive means operatively connecting said head lamps for energization of the head lamps with said main control switch, and means including said conductor extending from said light sensitive switch for energizing said main control switch at such time that said light sensitive switch and ignition switch are closed, said main control switch including a first switch section with which said head lamps are operatively connected, a second switch section, tail lamps having a conductor extending therefrom and connected with said second switch section, said second switch section having two positions both of which remain energized regardless of the position of adjustment of said main control switch.

2. A motor vehicle lighting system wherein the motor vehicle has a battery and an ignition switch operatively connected with the battery, said lighting system comprising a light sensitive switch, a conductor extending from the ignition switch to the light sensitive switch thereby connecting the battery, ignition switch and light sensitive switch in series, a conductor extending from said light sensitive switch, head lamps, a main control switch having a movable contact operatively connected with the transmission control mechanism of the motor vehicle, conductive means operatively connecting said head lamps for energization of the head lamps with said main control switch, and means including said conductor extending from said light sensitive switch for energizing said main control switch at such time that said light sensitive switch and ignition switch are closed, said main control switch including a first switch section with which said head lamps are operatively connected, a second switch section, tail lamps having a conductor extending therefrom and connected with said second switch section, said second switch section having two positions both of which remain energized regardless of the position of adjustment of said main control switch, said main control switch further including a third switch section, parking lights having a conductor connected therewith and connected with said third switch section so that said parking lights are under the control of said main switch.

3. A motor vehicle lighting system wherein the motor vehicle has a battery and an ignition switch operatively connected with the battery, said lighting system comprising a light sensitive switch, a conductor extending from the ignition switch to the light sensitive switch thereby connecting the battery, ignition switch and light sensitive switch in series, a conductor extending from said light sensitive switch, head lamps, a main control switch having a movable contact operatively connected with the transmission control mechanism of the motor vehicle, conductive means operatively connecting said head lamps for energization of the head lamps with said main control switch, and means including said conductor extending from said light sensitive switch for energizing said main control switch at such time that said light sensitive switch and ignition switch are closed, said main control switch including a first switch section with which said head lamps are operatively connected, a second switch section, tail lamps having a conductor extending therefrom and connected with said second switch section, said second switch section having two positions both of which remain energized regardless of the position of adjustment of said main control switch, said main control switch further including a third switch section, parking lights having a conductor connected therewith and connected with said third switch section so that said parking lights are under the control of said main switch, said first switch section being open when said second and third switch sections are closed.

4. A motor vehicle lighting system wherein the motor vehicle has a battery and an ignition switch operatively connected with the battery, said lighting system comprising a light sensitive switch, a conductor extending from the ignition switch to the light sensitive switch thereby connecting the battery, ignition switch and light sensitive switch in series, a conductor extending from said light sensitive switch, head lamps, a main control switch having a movable contact operatively connected with the transmission control mechanism of the motor vehicle, conductive means operatively connecting said head lamps for energization of the head lamps with said main control switch, and means including said conductor extending from said light sensitive switch for energizing said main control switch at such time that said light sensitive switch and ignition switch are closed, said main control switch including a first switch section with which said head lamps are operatively connected, a second switch section, tail lamps having a conductor extending therefrom and connected with said second switch section, said second switch section having two positions both of which remain energized regardless of the position of adjustment of said main control switch, said main control switch further including a third switch section, parking lights having a conductor connected therewith and connected with said third switch section so that said parking lights are under the control of said main switch, said first switch section being open when said second and third switch sections are closed, said first switch section being closed while said second switch section remains closed and said third switch section is opened whereby said head lamps are automatically energized at such time that the motor vehicle transmission control mechanism is adjusted to such a position that there is a drive connection established between the engine of the motor vehicle and the wheels thereof.

References Cited in the file of this patent

UNITED STATES PATENTS

| | | |
|---|---|---|
| 1,846,513 | Douglas | Feb. 23, 1932 |
| 1,981,985 | Braselton | Nov. 27, 1934 |
| 2,264,441 | Heuschkel | Dec. 2, 1941 |
| 2,888,611 | Matkins | May 26, 1959 |